A. S. KUX.
COMPOUND SHOCK ABSORBING SPRING.
APPLICATION FILED OCT. 7, 1915.
1,351,044.
Patented Aug. 31, 1920.
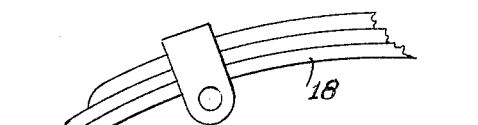
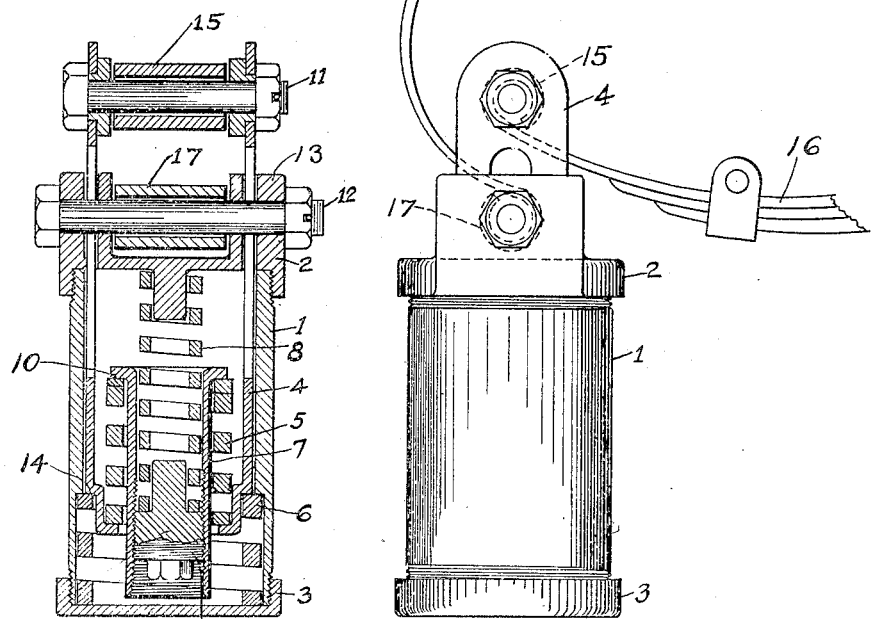
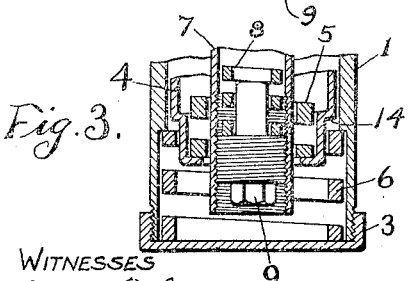
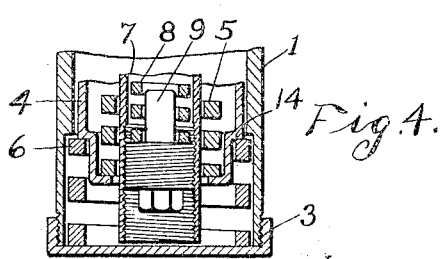
WITNESSES
INVENTOR
Albert S. Kux

UNITED STATES PATENT OFFICE.

ALBERT S. KUX, OF CHICAGO, ILLINOIS.

COMPOUND SHOCK-ABSORBING SPRING.

1,351,044.  Specification of Letters Patent.  Patented Aug. 31, 1920.

Application filed October 7, 1915. Serial No. 54,687.

*To all whom it may concern:*

Be it known that I, ALBERT S. KUX, a citizen of the United States, residing at Chicago, in the county of Cook and State of Illinois, have invented a new and useful Improvement in Compound Shock-Absorbing Springs, of which the following is a specification.

My invention relates particularly to resilient springs, such as are adaptable between the suspension ends of vehicle springs.

Distinctive objects of my invention are to provide an exceedingly simple and effective protective device for absorbing shocks between the body and the running gear of vehicles. To obviate the sharp rebound due to the sudden return of the common vehicle spring, which action is known to be of a most destructive character. To employ only compression springs because of their superior efficiency over other types of springs.

In the drawing accompanying and forming a part of this specification Figure 1 is a view of the suspension ends of a pair of vehicle springs connected up with my device.

Fig. 2 is a sectional view of the springs, the casing and a preferred construction of the parts composing my invention.

Figs. 3 and 4 are views showing the position the springs will take under various tensions.

Similar numerals refer to similar parts in the different views on the drawing.

In general, my invention comprises a casing 1, made fast to a head 2 at one end and a cap 3, at the other end; forming a practically closed receptacle for the suspension straps 4, to carry a primary compression spring 5, and having a shoulder 14, to operate upon a compression spring 6; a cylindrical member 7 having a flange 10, resting upon the free end of the spring 5, a secondary compression spring 8, resting upon a plug 9, which is adjustably secured within the member 7, to provide proper tension upon only two or the combination of all three aforesaid springs. Hanger bolts 11 and 12 are suitably arranged in the outer ends of the straps 4, and lugs 13, on the head 2, for the suspension of my device on standard vehicle springs.

Having thus outlined the simplicity of construction, it is obvious that the receptacle may contain a suitable lubricant; and should a spring be defective it may readily be replaced by another.

In operation I fasten the bolt 11 in the loop 15 of the nether spring 16 and the bolt 12 likewise, in the loop 17, of the upper spring, 18.

It is to be clearly understood that with a variation in adjustment of the plug 9 any one of the following or intermediate results will be obtained.

1st. The relative position of the springs as shown in Fig. 2, indicates that the tension is such upon the springs 5 and 8 as will balance the weight of the vehicle and bring the shoulder 14 to rest upon the spring 6, without however compressing the latter. Under this condition the parts are in a favorable position to at once take up a recoil or a direct impact upon the hangers of the device.

2nd. A condition presented in Fig. 3, is such as when less tension is normally put upon the springs than is required in the above position:

With this adjustment it is possible to successfully cope with such vibrations as will hardly set the vehicle springs in motion.

3rd. Fig. 4 shows the springs under more tension than in either of the above cases and is such as will readily neutralize the undulating motion of vehicles, under a heavy load.

In each of the foregoing instances the initial force of the shock imparted to a vehicle brings the body and running-gear closer together when separating the hanger bolts; this action tends to pull on the straps 4, which carries the primary spring 5; at the same time forcing the receptacle downward; the head 2, compressing the secondary spring 8, which is deflected under considerably less pressure than the primary spring 5, and by means of the connecting member 7, imparts pressure on the said primary spring 5; the springs being brought into action successively will gradually take up the shock.

When the recoil of the vehicle springs takes place, which is well known to have a serious and damaging effect upon the springs and gearing as well as causing a prolonged and unpleasant bounding of the vehicle body, the inverse action is transmitted through the strap 4, and by means of the shoulder 14, to the compression spring 6, where it is counteracted or neutralized.

It will be noted that the spring 6 is under constant tension by means of being compressed between the cap 3 and a shoulder 1' provided on the interior of casing 1.

Various changes might be made in the general form and arrangement of parts described without departing from my invention, hence I do not limit myself to the precise details set forth, but consider myself at liberty to make such changes and alterations as fairly fall within the spirit and scope of the appended claims.

Having thus clearly described my invention and its usefulness, so that any one skilled in the art will be able to make and use the same, I claim:

1. In a device of the class described, the combination with hanger members, of two compression springs arranged in series between said hanger members, one spring coiled within the other and spaced therefrom, means for connection between said two springs comprising a tube having an outward extending flange on its upper end and a screw nut on its interior at its lower end, and a third coiled compression spring always under tension arranged to counteract or take up the recoil of, said first named springs.

2. In a device of the class described, the combination with hanger members and an outer cylindrical casing, of two coiled compression springs within said casing, said springs being concentrically arranged one within the other spaced apart and connected in series, means for connecting the springs together comprising a tube provided with an outwardly extending flange at its upper end and a screw nut threaded into its lower end, means for connecting one spring to one hanger member and the other spring to the other hanger member and a third spring held under constant tension between the lower end of the outer casing and a shoulder within the outer casing to counteract or take up the recoil of said first named springs.

3. In a device of the class described, the combination with hanger members, of an outer cylindrical casing, a centrally disposed tubular spring guiding member within said casing, two coiled compression springs within said casing concentrically arranged one within the other and connected together at one end in guided association with said central guiding member, the other end of each spring having connection to one of the hanger members and a third coiled compression spring under constant tension arranged to counteract or take up the recoil of said first named springs.

4. In a device of the class described, the combination with hanger members, of an outer cylindrical casing, a centrally disposed tubular guiding member in said casing, two coiled compression springs within said casing concentrically arranged one within the other spaced apart and connected together at one end in guided association with said centrally disposed guiding member which is positioned between the springs, the free end of one of said springs having connection to one of said hanger members, the free end of the other of said springs having connection to the other of said hanger members, means carried by said guiding member comprising an internal nut to adjust the tension of said springs and a third compression spring under constant tension arranged to counteract or take up the recoil of said first named springs.

5. In a device of the class described, the combination with hanger members, of a cylindrical casing connected to one hanger member, a central tubular spring guiding member in said casing, an adjustable spring engaging member on said guiding member comprising a nut threaded into said guiding member, a coiled compression spring engaged by said adjustable member with its free end guided by said central guiding member, means completing the connection between said guided free end and the other hanger member and a coiled compression spring held under constant tension to counteract or take up the recoil of said first named spring.

6. In a device of the class described, the combination with hanger members, of a cylindrical casing connected to one hanger member, a central tubular guiding member in said casing, an adjustable spring engaging device on said guiding member comprising a nut threaded into said tubular guiding member, a coiled compression spring engaged by said adjustable device with its free end guided by said central guiding member, a coiled compression spring connected between said guided end of the first named spring and the other hanger member and a third coiled compression spring under constant tension arranged to counteract or take up the recoil of said two first named springs.

7. In a device of the class described, the combination with hanger members for connection respectively to a supporting element and a supported element, a coiled compression spring connected at one end to one of the hanger members, a second coiled compression spring connected at one end to the free end of said first named compression spring whereby said springs act against each other at said point of connection, a tubular connection between said two springs axially within one spring and without the other spring, an outwardly extending flange on said tubular connection engaged by the free end of one of said springs, a threaded nut within said tubular connection engaged by the free end of the other of said springs and a third coiled compression spring under constant tension arranged to counteract or take up the recoil of said two first named springs.

8. In a device of the class described, the combination with hanger members, a cylindrical casing having heads for closing the ends thereof, one of said heads associated with one hanger member and perforated to admit the entrance of connections to the other hanger member, a floating tubular guiding member concentrically arranged within said casing, a coiled compression spring engaging one end of said tubular guiding member and one hanger member, a second coiled compression spring engaging the other end of said tubular guiding member and the other hanger member and a third coiled compression spring under constant tension arranged to counteract or take up the recoil of said first named springs.

9. In a device of the class described, the combination with hanger members, of a coiled compression spring having one of its ends engaging one of said hanger members and its other end operating against the other hanger member and a coiled compression spring under constant tension between two fixed abutments arranged to counteract or take up the recoil of said first named spring.

10. In a device of the class described, the combination of hanger members, of two coiled compression springs one within the other, one end of each spring acting against a hanger member, a floating tubular guiding member for operatively connecting the two remaining ends of the springs and a third coiled compression spring under constant tension arranged to counteract or take up the recoil of said first named springs.

11. In a device of the class described, the combination with hanger members, of two coiled compression springs arranged one within the other, one end of each spring connected to one hanger member, adjustable means comprising a screw nut for operatively connecting the remaining ends of said springs whereby the tension of said spring action against one another may be adjusted and a third coiled compression spring under constant tension arranged to counteract or take up the recoil of said first named springs.

12. In a device of the class described, the combination with hanger members, of two coiled compression springs concentrically arranged one within the other and connected to each other and to the respective hanger member, a third compression spring held under constant tension arranged to counteract or take up the recoil of said first named two springs and an oil containing casing inclosing said springs comprising a cylinder and heads screwed onto said cylinder.

13. In a device of the class described, a cylindrical casing, an upper head screwed thereon, a lower head screwed thereon, a concentric boss extending into the casing from the upper head, the upper end of a coiled compression spring encircling said boss, a concentrically arranged tubular guiding member into which the lower end of said spring extends and is guided thereby, means within the lower end of said guiding member against which said spring rests, means on the exterior of the upper end of said guiding member to serve as a stop, a second coiled compression spring with its upper end resting against said stop, a spring support loosely fitted about the lower end of said tubular guiding member on which the lower end of said second named spring rests connected by two arms to a hanger member above the said upper head and the other hanger member connected to the upper head, said upper head provided with perforations to admit the passage of connections to the one hanger member.

14. In a device of the class described, a cylindrical casing, an upper head screwed thereon, a lower head screwed thereon, a concentric boss depending from the upper head into the casing, a coiled compression spring within the casing having its upper end encircling said boss, a concentrically arranged tubular guiding member within the casing into which the lower end of said spring extends, means within the lower end of said guiding member against which said spring rests, an outwardly extending flange on the upper end of said guiding member to serve as a stop, a second coiled compression spring arranged about said guiding member with its upper end resting against said stop, a spring support independent from and encircling the lower end of said guiding member on which the lower end of said second spring rests, a third coiled compression spring held under constant tension between a shoulder on the inner wall of the cylindrical casing and the lower head arranged to take against said spring support and counteract or take up the recoil of said first named two springs, a hanger member above said upper head, suitable arms connecting the spring support to said hanger member and the other hanger member connected to the upper head.

15. In a device of the class described, two transverse bolts one above the other, a pair of spring supporting arms suspended from one of said bolts, a head suspended from the other bolt, a spring support secured to the lower ends of said arms, a pair of coiled compression springs arranged one within the other interposed between said spring support and said head, a second spring support below the first support suspended from the head and a third coiled compression spring held under constant tension interposed between said two spring supports to counteract or take up the recoil of the first named springs.

16. In a device of the class described, a cylindrical casing, an upper head screwed thereon, a lower head screwed thereon, a concentric boss depending from the upper head into the casing, a coiled compression spring within the casing having its upper end encircling said boss, a concentrically arranged tubular guiding member within the casing into which the lower end of said spring extends, an adjustable bearing member in the lower end of said guiding member against which said spring rests, means on the outside of said guiding member at the top to serve as a stop, a second coiled compression spring on the outside of said guiding member having its upper end resting against said stop, a spring support independent from and encircling the lower end of said guiding member on which the lower end of said second named spring rests, a third coiled compression spring under constant tension interposed between said spring support and the lower head, a hanger member above said upper head, suitable arms connecting said spring support to said hanger member and a second hanger member connected to the upper head.

17. In a device of the class described, two transverse bolts one above the other, a pair of spring supporting arms suspended from one of said bolts, a head suspended from the other bolt, a spring support secured to the lower end of said arms, a pair of coiled compression springs arranged one within the other interposed between said spring support and said head, adjustable means for connecting said two springs together whereby the spring tension of the device can be varied, a second spring support below the first spring support suspended from the head and a coiled compression spring held under constant pressure interposed between said two spring supports to counteract or take up the recoil of the first named springs.

18. In a device of the class described, the combination with hanger members, of two coiled compression springs one within the other, one end of each spring acting against a hanger member, a floating tubular guiding member for operatively connecting the two remaining ends of the springs and a third coiled compression spring under constant tension arranged to counteract or take up the recoil of said first named springs, said springs and guiding member contained entirely within the confines of a tubular casing closed at each end.

ALBERT S. KUX.

Witnesses:
  E. G. JACKER,
  B. C. RINEHART.